United States Patent [19]

Huang

[11] Patent Number: 4,865,223

[45] Date of Patent: Sep. 12, 1989

[54] DEVICE FOR ORGANIZING DISK IMPLEMENTS AND DISPENSING SINGLE SHEETS OF PAPER

[75] Inventor: Harrison Huang, Shenkang, Taiwan

[73] Assignee: Glory Formosa Co., Ltd., Taiwan

[21] Appl. No.: 195,701

[22] Filed: May 18, 1988

[51] Int. Cl.[4] ........................ B65H 3/02; B65G 59/02

[52] U.S. Cl. .................................... 221/259; 221/199; 221/241; 221/262; 221/274; 221/276; 206/214; 206/371; 206/818

[58] Field of Search ........................ 221/24, 34, 36, 40, 221/44, 92, 97, 199, 210, 213, 214, 215, 216, 241, 242, 259, 262, 274, 276; 211/45, 50, DIG. 1; 312/50, 183; 206/214, 215, 224, 232, 371, 555, 556, 818

[56] References Cited

U.S. PATENT DOCUMENTS

| | | | |
|---|---|---|---|
| 1,016,779 | 2/1912 | Ruppel | 221/259 |
| 1,143,391 | 6/1915 | Henderson | 221/262 X |
| 2,202,300 | 5/1940 | Posnack | 211/50 |
| 2,290,006 | 7/1942 | Trollen | 221/259 X |
| 2,457,421 | 12/1948 | Warren | 211/DIG. 1 |
| 2,727,655 | 12/1955 | Pearce | 221/259 |
| 2,751,112 | 6/1956 | Bierwert | 221/199 |
| 3,517,855 | 6/1970 | Hillis | 221/259 |
| 4,176,743 | 12/1979 | Fitzpatrick | 211/50 X |
| 4,696,399 | 9/1987 | Windorski | 211/50 X |

FOREIGN PATENT DOCUMENTS

| | | | |
|---|---|---|---|
| 2380895 | 10/1978 | France | 206/215 |

*Primary Examiner*—Joseph J. Rolla
*Assistant Examiner*—Edward S. Ammeen
*Attorney, Agent, or Firm*—Brumbaugh, Graves, Donohue & Raymond

[57] ABSTRACT

A device for organizing desk implements and for dispensing single sheets of paper. By repeatedly depressing and releasing a pressing bar mounted on a casing containing a stack of paper, one sheet at a time is advanced gradually from a slit in the casing. The device also has a pen-receiving stand aligned with the pressing bar, and one or more concave depressions in its upper surface in which paper clips or the like are retained by magnetic discs affixed to the underside of the depressions.

3 Claims, 3 Drawing Sheets

DEVICE FOR ORGANIZING DISK IMPLEMENTS AND DISPENSING SINGLE SHEETS OF PAPER

BACKGROUND OF THE INVENTION

This invention relates to a multipurpose stationery seat especially provides a sheet of paper, which is selected and preset in advance, for the users. Furthermore, together with two magnetic disks and a pen stand outside, this multipurpose stationery seat offers a convenient service to the users.

Because the changes of the life style and the society structure, consumers appeal to a high quality and high efficiency product. Monopurpose products are no longer become useful to the users, and bring a lot of inconvenience to them as well. Especially for those who work in the office, monopurpose stationery and tools occupy a large space and cause more trouble for the users to make use of them in different places.

Office stationery, such as telephone message notes, memo, pins and paper clips, are essential for people who work in the office. Without them, people will have more difficulties in carrying out their works therefore, if users don't use these stationery efficiently that will bring them inconvenience in making use of these stationeries.

There are a bunch of stationery in the market, most of them have been emphasized on their shapes. However, lacking good functions, they become less practical and efficient. Thereby, an elegant shape and also with several functions stationery is what we need.

SUMMARY OF THE INVENTION

It is an object of this invention to provide a multipurpose stationery seat which could supply spaces for several stationeries such as pen, pins, paper clips, paper, to put onto it and at the same time to give users the most convenience.

Another object of this invention is to deliver a sheet of paper gradually. These paper will not be exposed normally. With a delicate design, it provides a good atmosphere to the users.

It is a still further object of the present invention to provide a elegant shape in the multipurpose stationery seat that could satisfy those who require to improve their working environment.

A more complete understanding of these and other features and advantages of the present invention will become apparent from a careful consideration of the following detailed description of certain embodiments illustrated in the accompanying drawings.

DETAILED DESCRIPTION OF THE INVENTION

Figure 1:
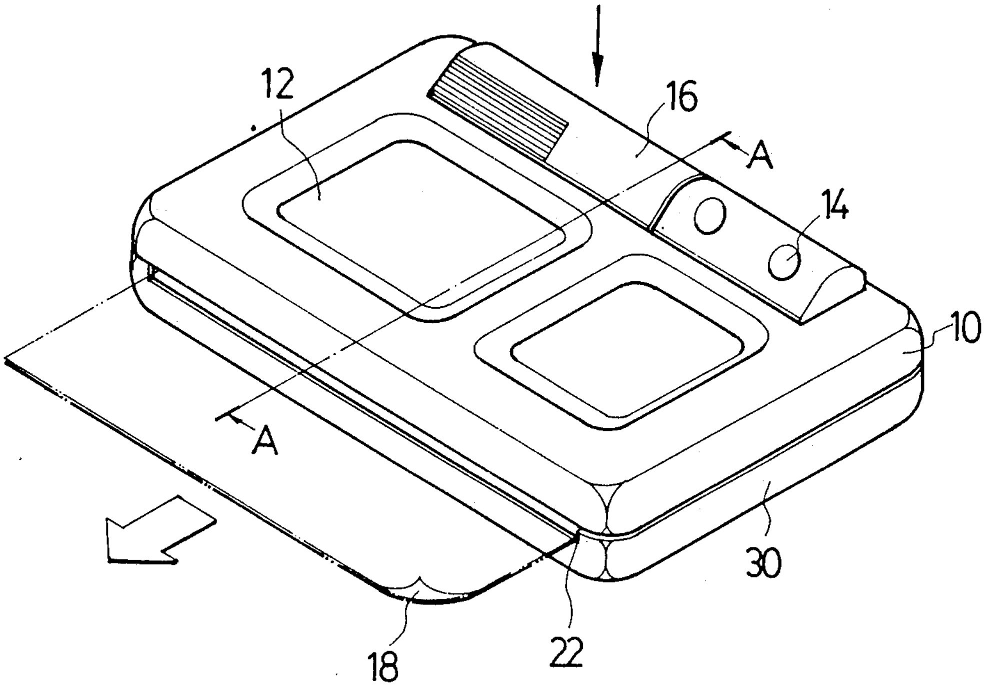
FIG. 1 is a perspective view showing the common method of using the invention.

Referring to FIG. 1, this invention is mainly composed of an upper cover 10 and a bottom seat 30. Inside the upper cover, there are two concave magnetic disks 12 on each side for the ferrous made stationery, such as pins and paper clips, to put and fix on that; a pen stand 14 and a press button 16 are convex to the upper cover 10, showing a beautiful slope, that provide a place to put a pen and a function to deliver a sheet of paper 18 from a paper delivering slit 22. This paper deliverying slit 22 is slightly wider than the width of a sheet of paper and allows different size of paper 18 which are smaller than the slit 22 to be delivered from it.

Figure 2:
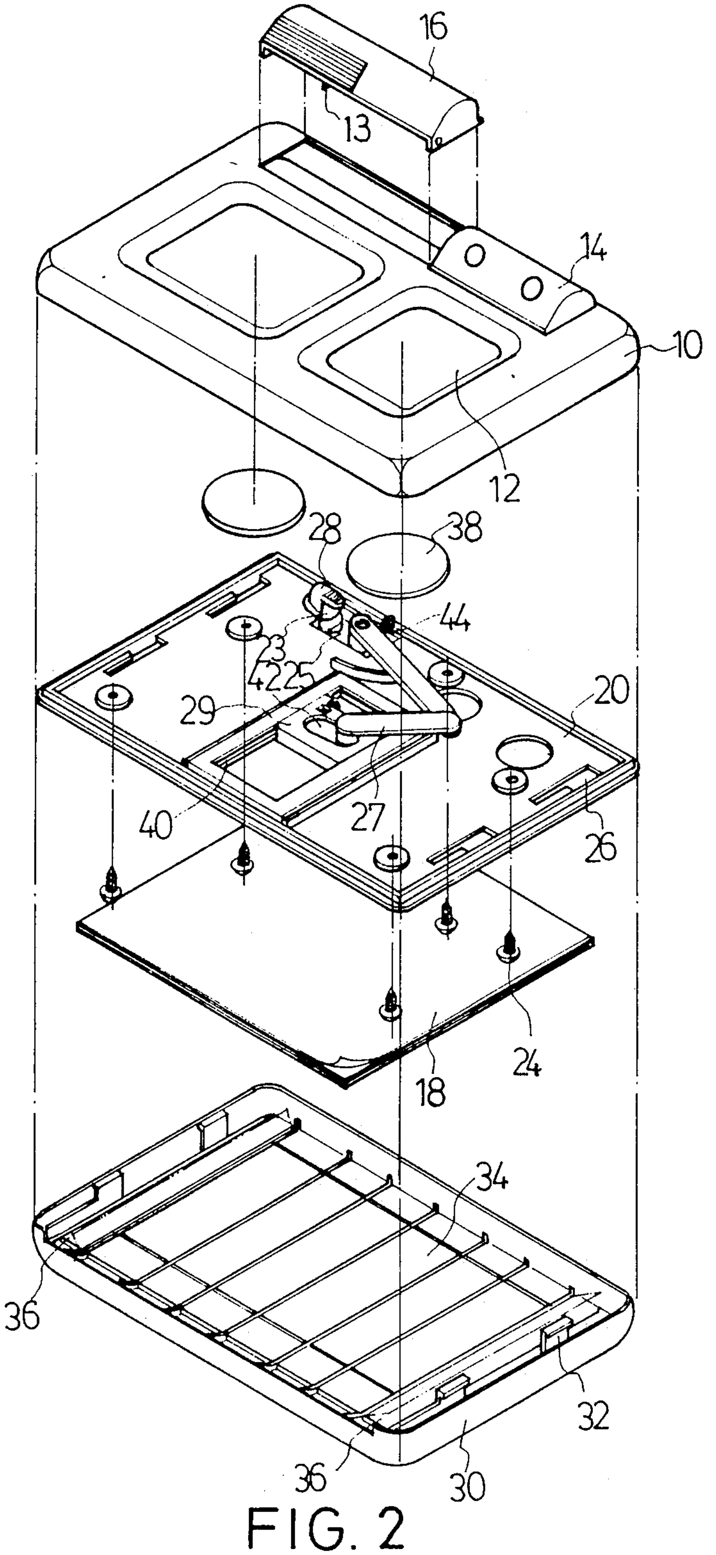
FIG. 2 is an exploded perspective view showing me components of the invention.
Figure 3:
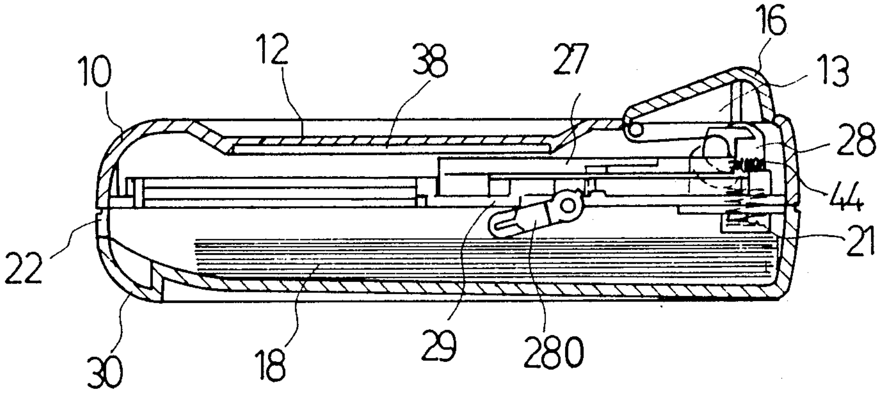
FIG. 3 is a side elevation cross-sectional view from A—A line in FIG. 1.

Referring to FIG. 2 and FIG. 3, there is shown an exploded perspective view and side elevation cross-sectional view of the invention respectively. The major parts are an upper cover 10, a middle plate 20 secured to the upper cover with a plurality of screws, and a bottom seat 30, wherein the upper cover includes: two magnetic disks 12, a pen stand 14 and a press button 16 for delivering paper, the middle plate 20 enable the paper running structure to act, and the bottom seat 30 is composed by some available locks 32 to lock the holes 26 on the middle plate 20; There is a paper disk 34 on the bottom seat 30 to provide the space for the paper 18. As soon as the action starts, a rubber on a pushing component 280 will push a sheet of paper 18 gradually delivered from the paper delivering slit 22. In addition, on each of the both sides of the paper disk 34, a limited plate 36 is pivoted to the bottom seat 30 respectively. When the limited plates 36 are not bent up, only the paper 18 with the same size as the width of the paper holding plate 34 are allowed to put in. On the other hand, the paper 18 with other sizes are allowed to put in when the limited plates 36 are bent upwardly. This could reach a selective function of making use of paper 18. Furthermore, two magnets 38 are put in under the bottom of the upper cover 10 and right beneath the magnetic disks 12, which enable the ferrous staionery to be absorbed onto the two concave disks 12.

Figure 4:
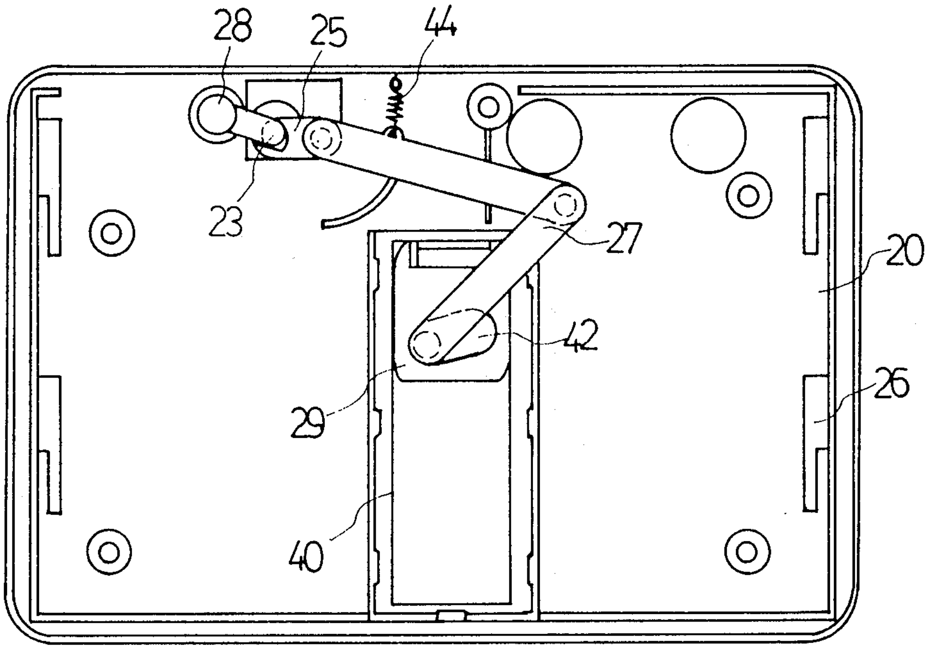
FIG. 4 is an upper elevation showing the middle plate of the invention.

Referring to FIG. 3 and FIG. 4 which are the cross-sectional view and the upper perspective view of the middle plate of this invention, the major part of the paper running structure is a head-stand 28, which has a spring 21 at the bottom of the head stand to provide an action of it; Outside the top of this head-stand 28, there is a slant press pole 23. When the head-stand 28 is pressed doward by the isolated plate 13 of the press button 16, the slant press pole 23 will force the dispersed bar 25 to make the crank arm 27 push a sliding element 29 move back and forth in a sliding furrow 40 which guides the sliding element. In order to approach the largest tension of the crank arm 27, there is a slant trough 42 to help the crank arm 27 get the largest range of action. While the crank arm 27 reached the maximum tension, a pull spring 44 connected with the crank arm 27 will reverse the back and forth action. Underneath of the sliding element 29, there is a pushing component 280 which is against with paper 18. On the top of this pushing component 280 covered with a rubber. By using the rough surface of the rubber, a sheet of paper 18 could be delivered from the paper delivering slit 22 while in the process as the sliding element 29 is pushing around. By repeating this action over and over, all the paper could be delivered from the slit 22.

The main issue provided by this invention is to supply a multipurpose stationery seat that allows those essential stationery on/inside of it. For example, ferrous stationery such as pins and paper clips could be fixed on the magnetic disks. A pen could be put outo a pen stand, and different size of selected paper could be put inside it. Through pressing the pressing button, the inside structure will deliver a sheet of paper from a paper delivering slit 12 and reaches the convenience of using notes and memos. It has been tested and approved that this multipurpose stationery seat could reach the object of practice. In addition, with an elegant shape, this invention indeed provides a convenient multipurpose stationery seat to the modern people.

Although the present invention has been described with a certain degree of particularity, it is understood that the present disclosure has been made by way of example and that changes in details of structure may be made without departing from the spirit thereof.

I claim:

1. A device for organizing desk implements and dispensing individual sheets of paper from a loose stack thereof comprising:

an upper cover member having a predetermined shape and area and having forward and rearward edges and laterally spaced apart opposite side edges and having at least one dish-like concave depression formed in its upper surface adapted to receive a respective desk implement, said cover member having a rectangular opening adjacent the rearward edge thereof extending from a point near one side edge for a distance significantly less than the spacing between said side edges in which an elongated pressing bar of upwardly convex shape is pivotally supported for limited rotation about an axis disposed substantially in the plane of said cover member and parallel to said rearward edge;

an intermediate flat plate member having substantially the same shape and area as said cover member secured to the underside of said cover member;

a bottom cover member detachably secured to said intermediate plate member for containing a loose stack of paper sheets, said bottom cover member having substantially the same shape and area as said upper cover member and with said upper member defining a casing having a slit extending transversely along a forward edge thereof and disposed below said intermediate plate member; and paper feeding means supported on said intermediate plate member comprising a guide element supported on an upper surface of said intermediate plate substantially equidistant from its side edges and extending rearwardly and perpendicularly from a forward edge of said plate member, a slide element mounted on said guide element for back and forth movement therealong, an arm extending downwardly and forwardly from said slide element and having friction means thereon arranged to rest on a top sheet of a stack of paper contained within said casing, spring-biased crank means comprising a plurality of pivotally interconnected arms pivotally connected at one end to said slide element and pivotally connected at its other end to said intermediate plate member at a location to be actuated by said elongated pressing bar, and crank-actuating means including a spring-biased vertically-oriented head arranged to be pressed downwardly against the action of the spring in response to depression of said pressing bar to cause forward movement of said slide element from a rest position, release of said pressing bar permitting return of said slide element to said rest position under the influence of the spring biasing of said crank means, whereby repeated depressing and release of said pressing bar causes said arm and the friction means carried thereby to advance the top sheet of paper step-by-step toward and through said casing slit.

2. A device according to claim 1, wherein the upper surface of said cover member is shaped to provide an upwardly extending pen-receiving stand aligned with and having the same upwardly convex shape as said pressing bar.

3. A device according to claim 1, wherein a disk formed of magnetic material is affixed to an under surface of said at least one concave depression for retaining ferrous implements within said concave depression.

* * * * *

UNITED STATES PATENT AND TRADEMARK OFFICE
CERTIFICATE OF CORRECTION

PATENT NO. : 4,865,223

DATED : September 12, 1989

INVENTOR(S) : Harrison Huang

It is certified that error appears in the above-identified patent and that said Letters Patent is hereby corrected as shown below:

First page, Item 54, "DISK" should read --DESK--;

Column 1, line 1, "DISK" should read --DESK--;

Column 2, line 13, after "screws" insert --24--.

Signed and Sealed this

Fifth Day of March, 1991

*Attest:*

HARRY F. MANBECK, JR.

*Attesting Officer*

*Commissioner of Patents and Trademarks*